United States Patent Office 3,409,506
Patented Nov. 5, 1968

3,409,506
MICROBIOLOGICAL PRODUCTION OF ESTERS
Nicholas J. Stevens, Colonia, John W. Frankenfeld, Atlantic Highlands, and John D. Douros, Jr., Millington, N.J., assignors to Esso Research and Engineering Company, a corporation of Delaware
No Drawing. Filed Dec. 8, 1965, Ser. No. 512,545
6 Claims. (Cl. 195—28)

ABSTRACT OF THE DISCLOSURE

Fermentation process for the production of esters which comprises fermenting an aliphatic hydrocarbon with *Micrococcus cerificans* in a suitable growth medium characterized by containing less than the amount required for maximum growth of mineral nutrients selected from the group consisting of divalent magnesium cation and divalent calcium cation.

---

This invention relates to a process for biosynthetically producing esters from hydrocarbons. In particular, this invention relates to converting hydrocarbons to fatty acid esters by the metabolic action of microorganisms. More particularly, this invention relates to the biosynthesis of waxy-esters from hydrocarbons by aerobically subjecting a hydrocarbon to the metabolic action of a gram negative bacteria in the presence of an aqueous mineral salts solution containing a limited concentration of mineral nutrients selected from the group consisting of magnesium, calcium, and a combination thereof. Still more particularly, this invention relates to the utilization of azelaic acid to stimulate said microbiological production of esters.

It is known that microorganisms can be aerobically cultivated on inexpensive hydrocarbon feed stocks in the presence of a non-limiting, aqueous inorganic salt growth medium in a suitable fermentation reactor. It is further known that as the hydrocarbon is assimilated by the microorganism during cultivation, various oxygenated organic compounds, e.g., acids, aldehydes, alcohols, esters, etc. are formed as by-products. Various methods have been proposed which favor microorganism cell production and restrict by-product formation and vice versa. However, there is a constant need for new and economic methods which result in the selective formation of one product or another.

It is, therefore, an object of the present invention to provide a process for the biosynthetic production of esters from hydrocarbons.

Another object of the present invention is to provide a process for stimulating the biosynthetic production of esters from hydrocarbons.

According to the present invention, it has now been discovered that if the aqueous mineral salts solution in which a microorganism is aerobically cultivated contains a limited concentration, i.e., below that amount needed for maximum growth of the microorganism, of the mineral nutrients selected from the group consisting of magnesium, calcium and a combination thereof, by-product formation of esters, is favored at the expense of microorganism cell growth. More specifically, it has been found that if the concentration of the divalent magnesium ($Mg^{++}$) cation in the aqueous mineral salts solution is restricted to not more than about 0.02 wt. percent, based on the total amount of the aqueous growth medium and/or if the concentration of the divalent calcium ($Ca^{++}$) cation is restricted to not more than about 0.01 wt. percent, based on total amount of the aqueous growth medium, the amount of ester by-product is significantly increased at the expense of cellular growth. It has further been found that the use of small amounts, e.g., between about 1 and about 75 p.p.m., of azelaic acid, together with the restricted magnesium and/or calcium cation concentrations, referred to hereinabove, stimulates the biosynthetic production of fatty acid esters.

The exact nature, substance and objects of this invention will be more clearly perceived and understood by referring to the following description and claims.

Hydrocarbon feeds which can be utilized for the present process are $C_1$–$C_{30}$ petroleum hydrocarbon feeds, preferably gas oils boiling in the range of between about 190° C. and about 400° C., preferably between about 190° C. and about 320° C. Other suitable feeds are $C_1$–$C_{30}$ normal and isoparaffins, cycloparaffins, monoolefins, diolefins, aromatics and mixtures thereof. Feeds available in large quantities and those particularly suitable are $C_{10}$–$C_{30}$ normal paraffins from gas oils, light naphthas, and normally gaseous feeds such as methane, ethane, propane, butane and mixtures thereof, e.g., natural gas. Where normally gaseous feeds are used, these are, of course, preferably supplied directly to the reactor through spargers submerged in the liquid medium. A further preferred feed is one which contains a substantial weight percentage, e.g., 70+ weight percent, of normal (straight chain) paraffin hydrocarbons having from 10 to 30 carbon atoms. While the presence of branched, non-aromatic hydrocarbons in amounts of up to 30% by weight in the hydrocarbon feed can be tolerated, concentrations in excess of 10 weight percent of non-normal, non-aromatic hydrocarbons are usually avoided since the preferred microorganisms employed in the present process are selective to normal hydrocarbons, especially intermediate range ($C_{12}$–$C_{20}$) n-paraffins. Therefore, the use of branched paraffins is preferably avoided.

A most preferred hydrocarbon feed is a $C_6$–$C_{30}$ feed stock which has been purified to reduce the level of aromatics, both plynuclear and mononuclear, to below about 0.5 weight percent, preferably below about 0.1 weight percent, more preferably below about 100 p.p.m. This is necessary since it has been discovered that organisms which attack aromatics do not usually attack paraffins.

A preferred process for purifying the hydrocarbon feed is to adsorb the normal hydrocarbons, preferably paraffins, by 5 A. molecular sieves followed by desorption and a clean-up of the desorbed normal hydrocarbons with 13X sieves or silica gel to adsorb remaining impurities, particularly aromatics. One such purification process is described in U.S. Patent 3,070,542, which is incorporated herein by reference. The essence of the disclosure of this patent is the finding that by preloading the molecular sieve by the displacing medium, preferably ammonia, and by introducing a displacing medium along with the feed, the rate of adsorption is increased and subsequent desorption greatly eased, particularly with high molecular weight materials. The clean-up step of the desorbed normal hydrocarbons can be performed in a manner described in co-assigned U.S. patent applications Ser. No. 223,078, filed Sept. 12, 1962, now U.S. Patent 3,228,995 issued Jan. 11, 1966, or Ser. No. 223,057, filed Sept. 12, 1962, now U.S. Patent 3,233,003 issued Feb. 1, 1966, which specifications are also incorporated herein by reference.

The purified hydrocarbon feed usually contains about 90+ weight percent of $C_{10}$–$C_{30}$ n-paraffins and up to about 10 weight percent of n-olefins. The preferred purified hydrocarbon feed contains about 95+ weight percent of $C_{11}$–$C_{30}$ n-paraffins and up to about 5 weight percent normal olefins containing from 11 to 30 carbon atoms.

The $C_{11}$–$C_{30}$ n-parafins feed can be petroleum feeds, e.g., gas oils boiling in the range of between about 190° C. and about 400° C., and more preferably between about 190° C. and about 320° C.

The amount of hydrocarbon feed supplied to the fermentation reactor (including the recycle), based on total aqueous growth medium supplied, is between about 0.1 and about 10 weight percent, preferably between about 0.5 and about 5 weight percent and especially between about 0.5 and about 2 weight percent when straight air is used as the oxygen carrying medium. When using oxygen-enriched gases, e.g., gases having 70+ weight percent oxygen, a preferred amount of hydrocarbon supplied to the reactor is between about 0.5 and about 5.0 weight percent, based on the total equeous growth medium. The weight percent of, for example, $C_{11}$–$C_{30}$ normal hydrocarbons actually existing in the slurry zone of the continuous reactor during by-product formation can range from between about 0.01 and about 1.0 weight percent, but usually ranges between about 0.01 and about 0.1, preferably between about 0.01 and about 0.05 weight percent.

Microorganisms which can be used in the present process include any aerobic, bacteria capable of assimilating $C_1$–$C_{30}$ hydrocarbons. Especially preferred are gram negative bacteria which assimilate paraffinic hydrocarbons. While the present invention is applicable to a broad scope of operable microorganisms, there are nine microorganisms which are especially suitable for hydrocarbon assimilation. These microorganisms are tabulated hereinbelow along with their corresponding A.T.C.C. registration numbers, which were secured by depositing samples with the American Type Culture Collection in Washington, D. C.

| Microorganism name: | A.T.C.C. number |
|---|---|
| Micrococcus cerificans | 14987 |
| Pseudomonas ligustri | 15522 |
| Pseudomonas pseudomallei | 15523 |
| Pseudomonas orvilla | 15524 |
| Alcaligenes sp. | 15525 |
| Cellumonas galba | 15526 |
| Brevibacterium insectiphilium | 15528 |
| Corynebacterium sp. | 15529 |
| Corynebacterium pourometabolum | 15530 |

Especially preferred is *Micrococcus cerificans*, isolated and identified by Dr. R. E. Kallio et al., Journal of Bacteriology vol. 78, No. 3, pages 441–448 (September 1959). Cultures of this organism have been deposited in the American Type Culture Collection, 212 M Street, Northwest, Washington 7, D.C. The full identification of this material is as follows:

Morphology: Cells are small, spherical, tending to be elliptical in old cultures and in media high in nitrogen. Cells from defined media average 0.5 to $1.0\mu$ in diameter, from complex media cell diameters 1.0 to $2.0\mu$. Cells occur singly or in clumps. Immotile, metachromatic granules and sudanophilic granules are not observed.

Gramreaction: Negative.

Colonies on defined agar are small (1 mm.), circular, convex, having entire edge. Colonies on nutrient agar are larger (2 to 5 mm.) raised mucoid, generally round.

Pigmentation: White, beige or tan variants occur.

Obligately aerobic. A wide variety of materials supports growth, yeast extract, casein hydrolyzate, long-chain alchohols and acids, long-chain normal alkanes and olefins.

Carbohydrate fermentation: No carbohydrates are fermented. Aerobically, many carbohydrates are assimilated. These include glucose, maltose, mannitol, sucrose, lactose, arabinose, rhamnose, sorbitol, dulcitol, and inulin. Aerobically, glucose is utilized with acid production. Gluconic acid has been identified.

Nitrate reduction: Negative. Gelatin liquefaction: Generally negative. Slow liquefaction may occur in some strains. Urea hydrolysis: Negative or slow hydrolysis. Catalase is produced. Hydrogen is not utilized. Optimal temperature is 25° C. Optimal growth pH is 7.0 to 8.5. Source: Iowa soil. Habitat: Soils.

It is noted that a more recent identification shows the organism is probably an Arthrobacter rather than a Micrococcus and closely resembles *Arthrobacter ureafaciens*. The following summary of products indicates the reasons for the preferred identification of this organism as an Arthrobacter:

| Micrococcus | "M. Cerificans" | Arthrobacter |
|---|---|---|
| Always gram positive early in fermentation. | Always gram negative | Gram negative or variable. |
| Cells in irregular masses | Like Arthrobacter | Short filament formation may occur with some rudimentary budding. |
| Never change size | do | Larger than usual, coccoidal cells may appear at times. |
| Never occur in a rod state | do | Large coccoid cells give rise to rod-shaped cells. |
| Carbohydrates frequently fermented. | do | Little or no acid from carbohydrates. |

It is also to be understood that the particular class and subclass of bacteria utilized is determined by the particular feed employed. For example, when the microorganisms assimilate methane or other gaseous paraffin feeds, the preferred class of microorganisms is Pseudomonadaceae, such as *Pseudomonas methanica*. When fermentation is performed using a light naphtha feed, the preferred classes of microorganisms are Pseudomonadaceae and Arthrobacter, such as *Pseudomonas fluorescens, Pseudomonas desmolyticum, Pseudomonas aeruginosa* and *Arthrobacter globiforme*.

In a preferred embodiment, the biosynthesis is conducted using a bacteria inoculant, especially gram negative coccus bacteria.

While any aerobic bacteria cells capable of assimilating normal $C_{10}$ to $C_{30}$ hydrocarbon feeds can be employed, preferred bacteria are as follows: *Micrococcus cerificans* (*Arthrobacter ureafaciens*), *Pseudomonas aeruginosa, Pseudomonas fluorescens, Nocardia opaca, Nocardia rubra, Nocardia coralina, Pseudomonas methanica, Pseudomonas desmolyticum* and *Mycobacterium phleie*.

Oxygen is supplied to the fermentation reactor in any form capable of being assimilated readily by the inoculant microorganism. Oxygen-containing compounds can be used as long as they do not adversely affect ester production. Conveniently, oxygen is supplied as an oxygen-containing gas, e.g., air, which contains between about 19 and about 22 mole percent oxygen. While it is preferable to employ air, oxygen-enriched air having more than 22 mole percent oxygen can be used. In general, between about 0.1 and about 10, preferably between about 0.5 and about 4.0, more preferably between about 0.8 and about 2.5, volumes per minutes of air are supplied to the reactor per volume of reactor liquid.

Nitrogen is also supplied to the fermentation reactor. The source of nitrogen can be any organic or inorganic nitrogen-containing compound which is capable of releasing nitrogen in a form suitable for assimilation by the microorganism. In the organic category, the following compounds can be listed as exemplary nitrogen-containing compounds which can be used: proteins, acid-hydrolyzed proteins, enzyme-digested proteins, amino acid, yeast extract, asparagine, urea, etc. For reasons of economy, it is usually preferable to employ an inorganic compound such as ammonia, ammonium hydroxide, or salts thereof such as ammonium phosphate, ammonium citrate, ammonium sulfate, ammonium acid phosphate, etc. A very convenient and satisfactory method of supplying nitrogen is to employ ammonium hydroxide, ammonium phosphate or ammonium acid phosphate, which can be added as the salt per se or can be produced in situ in the aqueous fermentation media by bubbling ammonia through the broth to which phosphoric acid was previously added, thereby forming ammonium acid phosphate. In this way the pH range of 5.5–7.5 is maintained and the requisite nitrogen is supplied. Ammonium hydroxide can be supplied to the reactor in amounts of between about 0.01 and about 1.0 weight percent, preferably between about 0.1 and about 0.15 weight percent, nitrogen.

In addition to the energy and nitrogen sources, it is also necessary to supply requisite amounts of selected mineral nutrients to the fermentation reactor. Thus, potassium, sodium, iron, magnesium, calcium, manganese, phosphorus and other nutrients are included in the aqueous growth medium. These necessary materials can be supplied in the form of their salts, and preferably their water-soluble salts. For example, the potassium can be supplied as potassium chloride, phosphate, sulfate, citrate, acetate, nitrate, etc. Iron and phosphorus can be supplied in the form of sulfates and phosphates, respectively, e.g., iron sulfate and iron phosphate. Usually most of the phosphorus is supplied as ammonium phosphate. When either ammonium phosphate or ammonium acid phosphate is used, it can serve as a combined source of nitrogen and phosphorus.

In accordance with the present process, it has been found that by limiting the concentration of selected nutrient mineral ions in the aqueous nutrient medium to below that required for maximum microorganism growth, the metabolic action of the microorganism can be harnessed to produce esters from the hydrocarbon feed in preference to microorganism cell growth. Thus, in the conventional biosynthesis fermenter, wherein microorganisms are aerobically cultivated, the primary function of the microorganism is to reproduce itself and thus yield, as product, microorganism cells. By-products of the biosynthetic cultivation, such as acids and esters are thereby kept to a minimum. However, by altering the composition of the aqueous mineral salts solution by limiting the concentration of selected mineral ions, by-products of the biosynthesis cultivation, such as fatty acid esters, can be selectively produced at the expense of cellular growth.

More specifically, it has been found that if the concentration of the magnesium and/or calcium mineral nutrients is restricted to levels below that required for maximum cellular growth, esters are formed at the expense of cellular production. The magnesium and calcium mineral nutrient concentrations can be restricted independently or at the same time. However, the concentration of the magnesium mineral nutrient has been found to be more critical than that of calcium for the selective production of esters. In general, the concentration of the divalent calcium ($Ca^{++}$) ion in the fermentation reactor should not be more than about 0.01 weight percent in order to promote the production of esters and, preferably, will range between about 0.005 and about 0.01 weight percent (0.05–0.10 grams/liter). The concentration of the divalent magnesium ($Mg^{++}$) ion in the fermentation reactor should not be more than about 0.02 weight percent in order to promote the production of esters and, preferably, will range between about 0.005 and about 0.02 weight percent (0.05–0.20 grams/liter). The following table contains a tabulation of the mineral nutrient ions conventionally employed in the aqueous growth medium; the salts by which these ions are conventionally supplied; and a comparison of the concentration of each ion for cellular growth versus ester production.

MINERAL NUTRIENT ION CONCENTRATION (GRAMS/LITER) [1]

| | | For Good Growth—Little By-Product | For Poor Growth—High By-Product |
|---|---|---|---|
| $CaCl_2$ | $Ca^{++}$ | 0.25 | 0.05–0.10 |
| $FeSO_4 \cdot 7H_2O$ | $Fe^{++}$ | 0.04 | [2] N/C |
| $KCl$ | $K^+$ | 1.0 | N/C |
| $MgSO_4$ | $Mg^{++}$ | 0.25 | 0.05–0.20 |
| $MnSO_4 \cdot H_2O$ | $Mn^{++}$ | 0.04 | N/C |
| $Na_2SO_4$, $NaCl$ | $Na^+$ | 0.5 | N/C |
| 85% $H_3PO_4$ | $PO_4^{---}$ | 2.5 | N/C |

[1] Weight percent = (g./l.)/10.
[2] No change.

In another embodiment of the present invention, it has been found that the use of minor amounts, e.g., between about 1 and about 75 p.p.m., of azelaic acid in the aqueous fermentation medium stimulates ester formation. Preferably, about 50 p.p.m. of azelaic acid is employed. Azelaic acid (1,7-heptane dicarboxylic acid) is generally prepared by the disruptive oxidation of ricinoleic acid.

The temperature at which the fermentation reaction of the present process is carried out can vary between about 20° C. and about 55° C. The exact temperature depends upon the specific microorganism being utilized; but, usually temperatures of between about 20° C. and about 45° C. are employed. Preferably, the fermentation is conducted at temperatures of between about 25° C. and about 40° C.

The pH of the biosynthesis bath is generally held at between about 5.5 and about 7.5. If the pH becomes too high, it can be lowered readily by the addition of a suitable acid to the fermentation media, e.g., $H_3PO_4$. In like manner, if the pH becomes too low, it can be raised by the addition of a suitable base, e.g., ammonia or ammonium hydroxide.

At the start up of the fermentation, the growth medium is inoculated with a vegetative microbial inoculum. The initial concentration of said inoculum at the outset of fermentation can vary widely, e.g., from about 0.1 to about 1.0 gram per liter of total fermentation media.

The fermentation reactor can be stirred during biosynthesis by any conventional means such as a paddle stirrer, propeller-type stirrer, rockers or other agitator means to completely admix the oxygen, mineral nutrients, hydrocarbon and microorganism. For example, paddle stirrers can be used having a horsepower rating of 1–100, preferably 5–30, per 1,000 gallons of liquid reactant medium.

The liquid residence time in continuous operations for a bacteria such as Micrococcus cerificans (Arthrobacter ureafaciens), i.e., the volume of liquid in the reactor divided by the amount of the material supplied (and products removed so as to maintain a constant liquid level in the reactor) per hour, is, in general, 1 to 10 hours, preferably 1 to 3 hours, more preferably 1.5 to 2.5 hours. The present process can, of course, be carried out by batch or continuous means.

The products produced in accordance with the present process are primarily acids and esters. The specific acids and esters produced will depend to a large extent on the hydrocarbon feed stock employed. Thus, for example, if a $C_{16}$ hydrocarbon is employed as the feed, the principal acid and ester produced will be palmitic acid and cetyl palmitate. Mixed hydrocarbon feeds will produce a spectrum of acids and esters.

The esters produced in accordance with the present process are essentially present in the aqueous fermentation media (extracellular). However, some of the esters formed are held within the microorganism cell itself. Esters produced can be extracted from the fermentation media from the concentrated microorganism cells using solvents such as acetone or acetone-water-hexane mixtures.

The esters produced in accordance with the present process are excellent starting materials for the production of $C_{10}$–$C_{20}$ alcohols. The esters are readily hydrogenated to alcohols in a simple one-step catalytic process. Moreover, the esters can readily be saponified to produce soap. In addition, the esters can be employed as chemical intermediates or for applications in which the ester is used per se.

The present process is more particularly described in the following examples which are intended as illustrative only since numerous modifications and variations therein will be apparent to those skilled in the art.

EXAMPLE 1

A 4-liter cylindrical reactor was thoroughly sterilized with steam. The reactor was equipped with a stirrer having a power rating of 40–60 horsepower per 1,000 gallons and with various equipment for operating the reactor continuously. The sterilized reactor was charged with 4 liters of an aqueous salt feed having the composition set forth in Run No. 1 of Table I. Sufficient normal hexadecane was then charged to the reactor so that about 1 weight percent, based on salt solution feed, was present. Thereafter, *Micrococcus cerificans* in the form of an inoculum was added to the reactor so that said microorganism was present in an initial concentration of about 0.5 gram/liter. The temperature of the reactor was adjusted to 95° F. and the pH regulated to about 7.0. Air was introduced into the reactor at a rate of between about 1.0 and about 3.0 liters/minute. The aqueous mineral salts solution was added at the rate of 2 liters/hour. Normal hexadecane was introduced at a rate of 20 grams/hour. A material balance was made at steady state conditions and the average percent carbon, unaccounted for as carbon dioxide and cells, calculated. This figure indicates the amount of carbon present in the ester and acid. In general, greater than 85% of the total acid and ester product is present as ester and usually greater than 90% of said total product is ester.

Run 2 was performed in the same manner as Run 1 as was Run 3 with the exception that the concentration of magnesium and calcium salts were changed. Results are tabulated in Table I.

The data contained in Table II demonstrate that the magnesium ion concentration is effective in regulating the amount of fatty acid ester produced; but, has no effect on the percent of hydrocarbon converted to cells, carbon dioxide, water and other by-products.

EXAMPLE 3

Growth media containing either 1 weight percent or 2 weight percent hydrocarbon were prepared having the following composition:

| Component: | Concentration (grams/liter) |
|---|---|
| n-Hexadecane [1] | 10 or 20 |
| $K_2HPO_4$ | 5.0 |
| $(NH_4)_2HPO_4$ | 10.0 |
| $Na_2SO_4$ | 0.5 |
| $MgSO_4 \cdot 7 H_2O$ | 0.4 |
| $FeSO_4 \cdot 7 H_2O$ | 0.02 |
| $MnSO_4 \cdot 4 H_2O$ | 0.02 |
| NaCl | 0.02 |
| Water (sufficient to make a volume of 100 mls.). | |

[1] Commercial n-hexadecane containing <1 weight percent $C_{16}$ n-monoolefin.

After regulating the pH to about 7.8, 100 ml. of each of the above-prepared media were introduced into separate 500 ml. New Brunswick gyratory incubated shake flasks and the flask contents sterilized by heating at 121° C. for about 15 minutes. Then about 1% (1 ml. per 100 ml. of growth medium) of an 18-hour vegetative inoculum of *Micrococcus cerificans* (*Arthrobacter ureafaciens*) was introduced into each of the flasks. The fermentation media were cultured under shaking conditions (300 r.p.m.) at 30° C. for 48 hours. The pH of the fermentation media at the end of the 48-hour period was about 5.5.

After 48 hours, the fermentation media were subjected to centrifugation and aliquots of the resultant slurries were extracted with four times their volume of acetone. Thereafter, the extracts were concentrated to one-half their volume by heating. The concentrated extracts were

TABLE I.—EFFECT OF CATION FEED CONCENTRATIONS ON ACID-ESTER FORMATION

| Run Number | 85% $H_3PO_4$ (g./l.) | KCl (g./l.) | $Na_2SO_4$ (g./l.) | $FeSO_4 \cdot 7 H_2O$ (g./l.) | $MgSO_4$ (g./l.) | $MnSO_4 \cdot H_2O$ (g./l.) | $CaCl_2$ (g./l.) | Average Percent Carbon Unaccounted for as $CO_2$ and Cells | Average Percent Hydrocarbon Converted |
|---|---|---|---|---|---|---|---|---|---|
| 1 | 2.5 | 1.0 | 0.5 | 0.04 | 0.25 | 0.04 | 0.5 | 9.7 | 91.0 |
| 2 | 2.5 | 1.0 | 0.5 | 0.04 | 0.25 | 0.04 | 0.5 | 9.4 | 94.8 |
| 3 | 2.5 | 1.0 | 0.5 | 0.04 | 0.2 | 0.04 | 0.2 | 19.7 | 97.2 |

The data contained in Table I demonstrates that when the concentration of the magnesium and calcium salts were reduced to about 0.2 g./l., the amount of ester and acid produced was significantly increased.

EXAMPLE 2

Runs 4, 5 and 6 were performed in a similar manner to Runs 1 through 3 with the exception that the air rate was between about 3.5 and about 4.0 liters per minute, and the mineral salt concentration for each of the runs was varied in accordance with the amounts tabulated in Table II.

then cooled to 0° C. so as to precipitate the esters formed during the fermentation reaction. This procedure was performed innumerable times using both the 1% and the 2% hydrocarbon growth media. The average amount of ester produced in these runs was about 0.5 gram per liter. The amount of cells produced per run amounted to about 9–10 grams per liter. Approximately 74% of hydrocarbon was converted during the fermentation runs.

EXAMPLE 4

A series of runs were performed in an analogous manner as those performed in Example 3 with the exception

TABLE II.—EFFECT OF CATION FEED CONCENTRATIONS ON ACID-ESTER FORMATION

| Run Number | 85% $H_3PO_4$ (g./l.) | KCl (g./l.) | $Na_2SO_4$ (g./l.) | $FeSO_4 \cdot 7 H_2O$ (g./l.) | $MgSO_4$ (g./l.) | $MnSO_4 \cdot H_2O$ (g./l.) | $CaCl_2$ (g./l.) | Average Percent Carbon Unaccounted for as $CO_2$ and Cells | Average Percent Hydrocarbon Converted |
|---|---|---|---|---|---|---|---|---|---|
| 4 | 1.50 | 0.30 | 0.10 | 0.03 | 0.15 | 0.03 | 0.10 | 26.5 | 92.5 |
| 5 | 2.50 | 0.30 | 0.10 | 0.03 | 0.15 | 0.03 | 0.10 | 27.7 | 94.8 |
| 6 | 1.50 | 0.30 | 0.10 | 0.03 | 0.25 | 0.03 | 0.10 | 6.0 | 91.0 | that about 50 p.p.m. of azelaic acid were incorporated into the aqueous growth media. On the average, about 3.2 grams per liter of ester together with about 7.6 grams per liter of cells were produced per run.

The data contained in Example 4 demonstrates that the use of minute quantities of azelaic acid in the growth medium increases fatty acid ester production by more than 600%.

While there are above described a number of specific embodiments of the present invention, it is obviously possible to produce other embodiments and various equivalent modifications thereof without departing from the spirit of the invention.

Having set forth the general nature and specific embodiments of the present invention, the true scope is now particularly pointed out in the appended claims.

What is claimed is:

1. A process for the biosynthetic production of esters, which comprises aerobically fermenting a hydrocarbon containing from about 1 to 30 carbon atoms dispersed in an aqueous growth medium through the action of a microorganism comprising *Micrococcus cerificans*, said aqueous growth medium containing less than the amount required for maximum growth of said *Micrococcus cerificans* mineral nutrients selected from the group consisting of divalent magnesium cation, divalent calcium cation, and a combination thereof, wherein said divalent magnesium cation concentration is between about 0.005 and about 0.02 wt. percent, and wherein said divalent calcium cation concentration is between about 0.005 and about 0.01 wt. percent.

2. A process according to claim 1 wherein said aqueous growth medium contains between about 1 and about 75 p.p.m. of azelaic acid.

3. A process according to claim 2 wherein said azelaic acid concentration is about 50 p.p.m.

4. A process according to claim 1 wherein said hydrocarbon is a $C_6$–$C_{30}$ hydrocarbon which has been purified to reduced the level of aromatics to below about 0.5 weight percent.

5. A process according to claim 1 wherein said hydrocarbon is n-hexadecane.

6. A process for the biosynthetic production of esters, which comprises aerobically fermenting n-hexadecane dispersed in an aqueous growth medium through the action of a microorganism comprising *Micrococcus cerificans*, said aqueous growth medium containing less than the amount required for maximum growth of said *Micrococcus cerificans*, of mineral nutrients selected from the group consisting of divalent magnesium cation, divalent calcium cation and a combination thereof, said divalent magnesium cation having a concentration between about 0.005 and about 0.02 wt. percent, said divalent calcium cation having a concentration between about 0.005 and 0.01 wt. percent, said growth medium also containing between about 1 and about 75 p.p.m. of azelaic acid.

References Cited

UNITED STATES PATENTS

| | | | |
|---|---|---|---|
| 3,169,099 | 2/1965 | Davis | 195—3 |
| 3,326,770 | 6/1967 | Coty | 195—3 |

OTHER REFERENCES

Stewart et al.: Journal of Bacteriology, vol. 78, No. 3, pages 441–448 (September, 1959).

LIONEL M. SHAPIRO, *Primary Examiner.*